United States Patent
Schwarz et al.

(10) Patent No.: US 10,190,496 B2
(45) Date of Patent: Jan. 29, 2019

(54) TURBOFAN ENGINE BEARING AND GEARBOX ARRANGEMENT

(71) Applicant: United Technologies Corporation, Hartford, CT (US)

(72) Inventors: Frederick M. Schwarz, Glastonbury, CT (US); William G. Sheridan, Southington, CT (US)

(73) Assignee: United Technologies Corporation, Farmington, CT (US)

( * ) Notice: Subject to any disclaimer, the term of this patent is extended or adjusted under 35 U.S.C. 154(b) by 650 days.

(21) Appl. No.: 14/776,080

(22) PCT Filed: Mar. 14, 2014

(86) PCT No.: PCT/US2014/026950
§ 371 (c)(1),
(2) Date: Sep. 14, 2015

(87) PCT Pub. No.: WO2014/152101
PCT Pub. Date: Sep. 25, 2014

(65) Prior Publication Data
US 2016/0025003 A1 Jan. 28, 2016

Related U.S. Application Data

(60) Provisional application No. 61/793,760, filed on Mar. 15, 2013.

(51) Int. Cl.
*F02C 3/10* (2006.01)
*F02C 3/107* (2006.01)
(Continued)

(52) U.S. Cl.
CPC .............. *F02C 3/107* (2013.01); *F01D 25/16* (2013.01); *F02C 7/06* (2013.01); *F02C 7/36* (2013.01);
(Continued)

(58) Field of Classification Search
CPC .. F02C 3/1077; F02C 7/06; F02C 7/36; F01D 25/16
See application file for complete search history.

(56) References Cited

U.S. PATENT DOCUMENTS

| | | | |
|---|---|---|---|
| 3,866,415 A | * | 2/1975 | Ciokajlo .................. F01D 7/00 416/153 |
| 4,044,571 A | | 8/1977 | Wildhaber |

(Continued)

FOREIGN PATENT DOCUMENTS

EP 2535527 A2 12/2012

OTHER PUBLICATIONS

International Search Report for PCT/US2014/026950, dated Aug. 4, 2014.

(Continued)

*Primary Examiner* — Woody A Lee, Jr.
(74) *Attorney, Agent, or Firm* — Bachman & LaPointe, P.C.

(57) ABSTRACT

A turbofan engine (300; 600; 700) comprising a fan shaft (120) configured to rotate about an axis (500) of the engine. A fan drive gear system (60) is configured to drive the fan shaft. The fan drive gear system has a centerplane (540). A first spool comprises a high pressure turbine (326) and a high pressure compressor (324). A second spool comprises an intermediate pressure turbine (328), a lower pressure compressor, and a shaft (334) coupling the intermediate pressure turbine to the lower pressure compressor. A third spool comprises a lower pressure turbine (330) coupled to the fan drive gear system to drive the fan. The engine has a plurality of main bearings. The turbofan engine has a single stage fan. Of the main bearings, at least one is a shaft-engaging bearing engaging a driving shaft (336) coupled to the fan drive gear system. A closest (340; 640) of the shaft-engaging bearings engaging the driving shaft behind the fan drive gear system (Continued)

has a centerplane (550) and a characteristic radius ($R_B$). The half angle (θ) of a virtual cone (530) intersecting the core flowpath inboard boundary at the gear system centerplane (540) and said closest of the shaft-engaging bearings at the characteristic radius ($R_B$) is greater than about 32°. A hub-to-tip ratio ($H_R:F_R$) of the fan is less than about 0.38.

31 Claims, 8 Drawing Sheets

(51) Int. Cl.

| | |
|---|---|
| *F01D 25/16* | (2006.01) |
| *F02K 3/06* | (2006.01) |
| *F04D 25/02* | (2006.01) |
| *F04D 29/059* | (2006.01) |
| *F04D 29/32* | (2006.01) |
| *F02C 7/36* | (2006.01) |
| *F02C 7/06* | (2006.01) |

(52) U.S. Cl.
CPC .............. *F02K 3/06* (2013.01); *F04D 25/028* (2013.01); *F04D 29/059* (2013.01); *F04D 29/321* (2013.01); *F05D 2260/40311* (2013.01)

(56) References Cited

U.S. PATENT DOCUMENTS

| | | | |
|---|---|---|---|
| 4,276,758 A | 7/1981 | Coman et al. | |
| 4,560,364 A | 12/1985 | Cohen | |
| 4,827,712 A * | 5/1989 | Coplin | F02K 3/06 |
| | | | 415/210.1 |
| 6,357,220 B1 * | 3/2002 | Snyder | F02C 7/32 |
| | | | 60/223 |
| 7,097,413 B2 * | 8/2006 | VanDuyn | F01D 21/08 |
| | | | 415/142 |
| 7,694,505 B2 | 4/2010 | Schilling | |
| 8,205,432 B2 | 6/2012 | Sheridan | |
| 2008/0098715 A1 * | 5/2008 | Orlando | F02C 7/36 |
| | | | 60/226.1 |
| 2010/0192595 A1 | 8/2010 | Orlando et al. | |
| 2010/0205934 A1 * | 8/2010 | Gallet | F01D 1/24 |
| | | | 60/268 |
| 2011/0056208 A1 * | 3/2011 | Norris | F02C 3/107 |
| | | | 60/772 |
| 2011/0123326 A1 | 5/2011 | DiBenedetto et al. | |
| 2011/0206498 A1 * | 8/2011 | McCooey | F02C 3/107 |
| | | | 415/124.1 |
| 2012/0257960 A1 * | 10/2012 | Reinhardt | F01D 25/162 |
| | | | 415/122.1 |
| 2012/0283029 A1 | 11/2012 | Lawrie | |
| 2012/0315130 A1 | 12/2012 | Hasel et al. | |
| 2013/0025257 A1 | 1/2013 | Suciu et al. | |
| 2013/0025258 A1 | 1/2013 | Merry et al. | |
| 2013/0192265 A1 * | 8/2013 | Schwarz | F02K 3/06 |
| | | | 60/805 |
| 2014/0030088 A1 * | 1/2014 | Coffin | F01D 25/16 |
| | | | 415/229 |
| 2014/0271135 A1 * | 9/2014 | Sheridan | F02C 7/36 |
| | | | 415/122.1 |

OTHER PUBLICATIONS

NASA Environmentally Responsible Aviation, Rolls-Royce Georgia Tech Research Institute, AIAA Public Brief, Jan. 11, 2012.
John Whurr, Future Civil Aeroengine Architectures & Technologies, Nov. 2007, Rolls-Royce.

* cited by examiner

TURBOFAN ENGINE BEARING AND GEARBOX ARRANGEMENT

CROSS-REFERENCE TO RELATED APPLICATION

Benefit is claimed of U.S. Patent Application Ser. No. 61/793,760, filed Mar. 15, 2013, the disclosure of which is incorporated by reference in its entirety herein as if set forth at length.

BACKGROUND

The disclosure relates to turbofan engines. More particularly, the disclosure relates to main bearing arrangements for turbofan engines having epicyclic gear reductions.

FIG. 1 shows a baseline engine of the forms shown in US Patent Application Publications 2011/0123326 and 2012/0257960, the disclosures of which are incorporated by reference in their entireties herein as if set forth at length.

Turbofan engines present a number of packaging concerns involving space, mass, and efficiency.

Gas turbine engines and similar structures feature a number of subassemblies mounted for rotation relative to a fixed case structure. Such engines have a number of main bearings reacting radial and/or thrust loads. Examples of such bearings are rolling element bearings such as ball bearings and roller bearings. Typically such bearings all react radial loads. Some such bearings also react axial (thrust) loads (either unidirectionally or bidirectionally). Ball bearings typically react thrust loads bidirectionally. However, if the inner race is configured to engage just one longitudinal side of the balls while the outer race engages the other longitudinal side, the ball bearing will react thrust unidirectionally.

Tapered roller bearings typically react thrust unidirectionally. Two oppositely-directed tapered roller bearings may be paired or "duplexed" to react thrust bidirectionally. An example is found in the fan shaft bearings of U.S. Patent Application Publication 2011/0123326A1. Another configuration is found in US Patent Application Publication 2012/0315130A1. Such fan shaft bearings are widely spaced to behave as two distinct bearings providing radial support at two spaced locations so as to adequately react overturning moments or torques normal to the bearing axis (e.g., pitch and yaw) and thus fully support the fan. Other duplexing examples involve closely spaced bearings which behave as a single bearing and their combination may be referred to as a single duplex bearing. Such a single duplex may need to have a longitudinally spaced apart additional bearing reacting radial loads (and optionally thrust loads) for their combination to react yaw and pitch loads.

US Patent Application Publications 2013/0025257A1 and 2013/0025258A1 disclose so-called three-spool engines wherein a high pressure spool comprises a high pressure compressor (or first) (HPC) and a high pressure (or first) turbine (HPT) respectively upstream of and downstream of a combustor. An intermediate spool comprises an intermediate pressure (or second) compressor (IPC) upstream of the HPC and an intermediate pressure (or second) turbine (IPT) downstream of the HPT. A low spool comprises a low pressure (or third or fan drive) turbine (LPT) downstream of the IPT and driving the fan via a fan drive gear system. The exemplary low spool comprises only the LPT and associated shaft assembly and does not include any compressor stages.

Unless explicitly or implicitly indicated otherwise, the term "bearing" designates an entire bearing system (e.g., inner race, outer race and a circumferential array of rolling elements) rather than the individual rolling elements. The term "main bearing" designates a bearing used in a gas turbine engine to support the primary rotating structures within the engine that produce thrust. This is distinguished, for example, from an accessory bearing (which is a bearing that supports rotating structures that do not produce thrust such as the fuel pump or oil pump bearings in an accessory gearbox).

SUMMARY

One aspect of the disclosure involves a turbofan engine comprising a fan shaft configured to rotate about an axis of the engine. A fan drive gear system is configured to drive the fan shaft. The fan drive gear system has a centerplane. A first spool comprises a high pressure turbine and a high pressure compressor. A second spool comprises an intermediate pressure turbine, a lower pressure compressor, and a shaft coupling the intermediate pressure turbine to the lower pressure compressor. A third spool comprises a lower pressure turbine coupled to the fan drive gear system to drive the fan. The engine has a plurality of main bearings. The turbofan engine has a single stage fan. Of the main bearings, at least one is a shaft-engaging bearing engaging a driving shaft coupled to the fan drive gear system. A closest of the shaft-engaging bearings engaging the driving shaft behind the fan drive gear system has a centerplane and a characteristic radius ($R_B$). The half angle ($\theta$) of a virtual cone intersecting the core flowpath inboard boundary at the gear system centerplane and said closest of the shaft-engaging bearings at the characteristic radius ($R_B$) is greater than about 32°. A hub-to-tip ratio ($H_R$:$F_R$) of the fan is less than about 0.38.

In additional or alternative embodiments of any of the foregoing embodiments, a length $L_D$ between the centerplane and a centerplane of a forward/upstreammost compressor disk is at least one of: about 2.0 times or less of a gear width $L_G$ of the fan drive gear system; about 60% or less of a core flowpath inboard radius $R_{T2}$ at the forward/upstreammost compressor disk centerplane; and about 50% less of a core flowpath inboard radius $R_T$ at the centerplane.

In additional or alternative embodiments of any of the foregoing embodiments, the length $L_D$ between the centerplane and the centerplane of the forward/upstreammost compressor disk is at least one of: about 1.5 times or less of the gear width $L_G$ of the fan drive gear system; about 50% or less of the core flowpath inboard radius $R_{T2}$ at the forward/upstreammost compressor disk centerplane; and about 40% less of the core flowpath inboard radius $R_T$ at the centerplane.

In additional or alternative embodiments of any of the foregoing embodiments, the length $L_D$ between the centerplane and the centerplane of the forward/upstreammost compressor disk is all of: about 2.0 times or less of the gear width $L_G$ of the fan drive gear system; about 60% or less of the core flowpath inboard radius $R_{T2}$ at the forward/upstreammost compressor disk centerplane; and about 50% less of the core flowpath inboard radius $R_T$ at the centerplane.

In additional or alternative embodiments of any of the foregoing embodiments, a universal joint couples the driving shaft to the fan drive gear system.

In additional or alternative embodiments of any of the foregoing embodiments, a diaphragm coupling couples the driving shaft to the fan drive gear system.

In additional or alternative embodiments of any of the foregoing embodiments, the diaphragm coupling is a Bendix-style coupling.

In additional or alternative embodiments of any of the foregoing embodiments, a flexure retains a carrier in the fan drive gear system. The flexure has a longitudinal cross section characterized by: an outboard mounting flange; an inboard portion engaged to the carrier; an intermediate portion extending along a radial span between the outboard portion and the inboard portion.

In additional or alternative embodiments of any of the foregoing embodiments, the intermediate portion does not depart from radial by more than a longitudinal distance of half of said radial span.

In additional or alternative embodiments of any of the foregoing embodiments, one or more of: a fan bearing is a duplex bearing; the fan is a single-stage fan; the case includes a core case and a fan case; the engine has a bypass ratio of greater than about 6.0.

In additional or alternative embodiments of any of the foregoing embodiments, a bearing support aft of the fan drive gear system has: a forward portion supporting the driving shaft by said closest of the shaft-engaging bearings; and an aft portion supporting the second spool shaft by a second bearing of the main bearings.

In additional or alternative embodiments of any of the foregoing embodiments, said closest of the shaft-engaging bearing and the second bearing are non-thrust bearings; the second spool shaft engages an additional bearing being a thrust bearing; and the driving shaft engages an additional bearing being a thrust bearing.

Another aspect of the disclosure involves a turbofan engine comprising a fan supported on a fan shaft. The fan shaft is configured to rotate about an axis of the engine. A fan drive gear system is configured to drive the fan shaft. The fan drive gear system has a centerplane. A first spool comprises a high pressure turbine and a high pressure compressor. A second spool comprises a lower pressure turbine, a lower pressure compressor, and a shaft coupling the lower pressure turbine to the lower pressure compressor. The turbofan engine has a plurality of main bearings. Of the main bearings, at least one is a shaft-engaging bearing engaging a driving shaft coupled to the fan drive gear system; a closest of the shaft-engaging bearings engaging the driving shaft behind the fan drive gear system has a centerplane and a characteristic radius ($R_B$). The half angle ($\theta$) of a virtual cone intersecting the core flowpath inboard boundary at the gear system centerplane and said closest of the shaft-engaging bearings at the characteristic radius ($R_B$) is greater than about 32°. A hub-to-tip ratio ($H_R:F_R$) of the fan is less than about 0.38. A universal joint or a diaphragm coupling couples the driving shaft to the fan drive gear system.

In additional or alternative embodiments of any of the foregoing embodiments, the angle ($\theta$) is about 33° to about 68°.

In additional or alternative embodiments of any of the foregoing embodiments, the hub-to-tip ratio ($H_R:F_R$) is about 0.24 to about 0.33.

In additional or alternative embodiments of any of the foregoing embodiments, the angle ($\theta$) is greater than about 40°.

In additional or alternative embodiments of any of the foregoing embodiments, the angle ($\theta$) is greater than about 50°.

In additional or alternative embodiments of any of the foregoing embodiments, the closest of the shaft-engaging bearings behind the fan drive gear system is a low spool bearing directly coupling the shaft to a case immediately behind the gear system.

In additional or alternative embodiments of any of the foregoing embodiments, at least one of said main bearings is a fan bearing engaging the fan shaft forward of the gear system centerplane.

In additional or alternative embodiments of any of the foregoing embodiments, the fan drive gear system comprises: a sun gear; a ring gear; a plurality of intermediate gears engaging between the sun gear and the ring gear; and a carrier holding the intermediate gears circumferentially spaced apart from each other.

In additional or alternative embodiments of any of the foregoing embodiments, the sun gear is coupled to the driving shaft.

In additional or alternative embodiments of any of the foregoing embodiments, the engine further comprises a third spool comprising an additional turbine and said driving shaft.

In additional or alternative embodiments of any of the foregoing embodiments, a bearing support aft of the fan drive gear system has: a forward portion supporting the driving shaft by said closest of the shaft-engaging bearings; and an aft portion supporting the second spool shaft by a second bearing of the main bearings.

In additional or alternative embodiments of any of the foregoing embodiments, said closest of the shaft-engaging bearing and the second bearing are non-thrust bearings. The second spool shaft engages an additional bearing being a thrust bearing. The driving shaft engages an additional bearing being a thrust bearing.

In additional or alternative embodiments of any of the foregoing embodiments, a universal joint couples the driving shaft to the fan drive gear system.

In additional or alternative embodiments of any of the foregoing embodiments, a diaphragm coupling couples the driving shaft to the fan drive gear system.

In additional or alternative embodiments of any of the foregoing embodiments, the diaphragm coupling is a Bendix-style coupling.

In additional or alternative embodiments of any of the foregoing embodiments, a flexure retains a carrier in the fan drive gear system. The flexure has a longitudinal cross section characterized by: an outboard mounting flange; an inboard portion engaged to the carrier; an intermediate portion extending along a radial span between the outboard portion and the inboard portion and not departing from radial by more than a longitudinal distance of half of said radial span.

In additional or alternative embodiments of any of the foregoing embodiments, one or more of: a fan bearing is a duplex bearing; the fan is a single-stage fan; a case includes a core case and a fan case; the engine has a bypass ratio of greater than about 6.0.

In additional or alternative embodiments of any of the foregoing embodiments, the fan is a single-stage fan having a centerplane and a tip radius ($F_R$). A distance ($L_F$) from the fan centerplane to the gear system centerplane is at least one of less than about 3.2 times the gear width ($L_G$) and less than about 0.37 times the tip radius.

In additional or alternative embodiments of any of the foregoing embodiments, the fan is a single-stage fan having a centerplane, a hub radius ($H_R$) at blade leading edges, and a tip radius ($F_R$). A ratio of said hub radius to said tip radius is between about 0.24 and about 0.33.

The details of one or more embodiments are set forth in the accompanying drawings and the description below. Other features, objects, and advantages will be apparent from the description and drawings, and from the claims.

Figure 1:
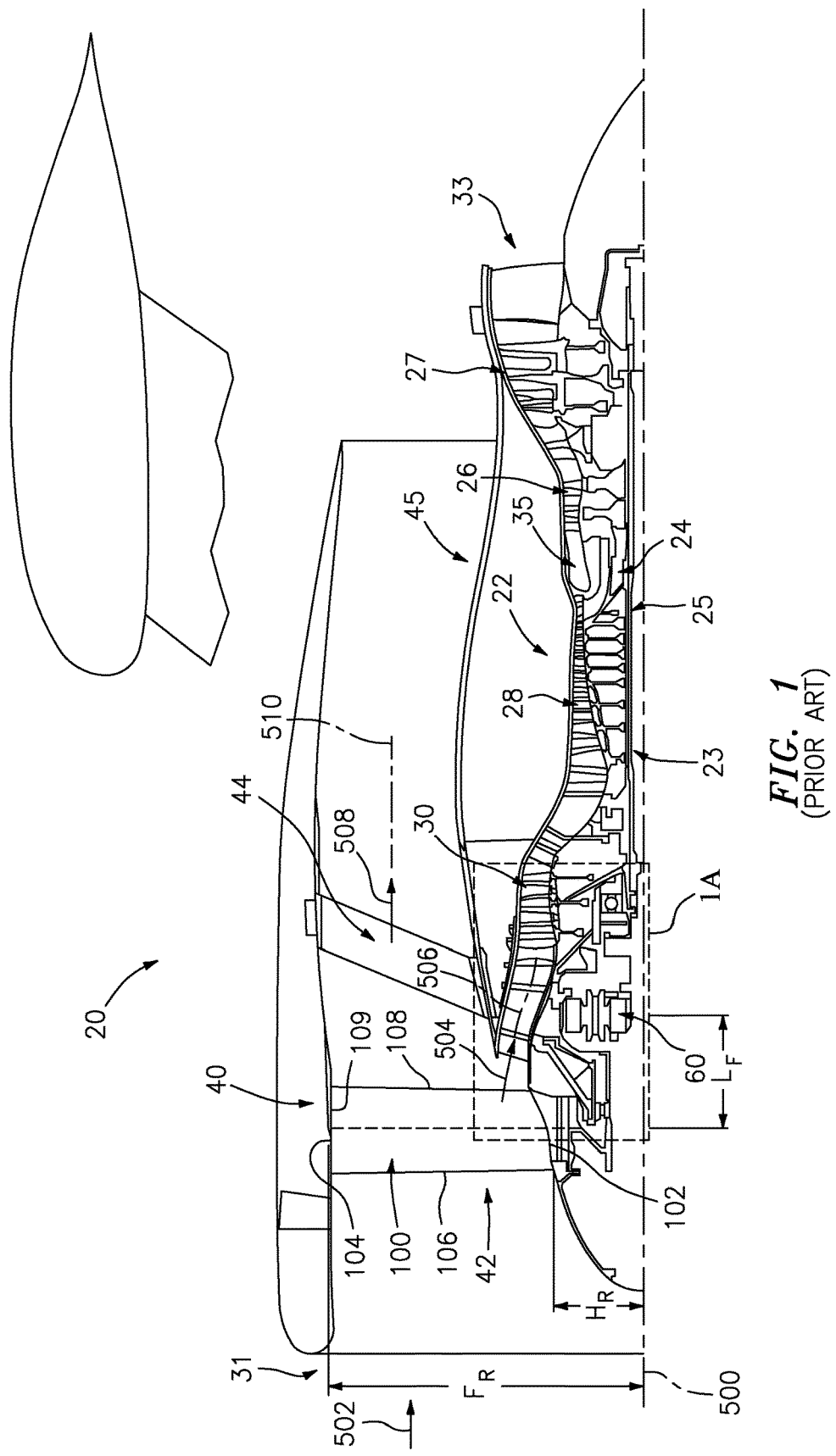
FIG. 1 is a partially schematic longitudinal sectional view of a baseline turbofan engine.

For ease of illustration and to avoid crowding of the drawings, many structures that are articles of revolution (e.g., various disk, shaft, bearing race, and case structures) are illustrated only by their portions crossing the drawing cut plane.

Like reference numbers and designations in the various drawings indicate like elements.

DETAILED DESCRIPTION

FIG. 1 shows a baseline turbofan engine 20 having an engine case 22 containing a rotor shaft assembly 23. An exemplary engine is a high-bypass turbofan. In such an engine, the normal cruise condition ratio of air mass flowing outside the core (e.g., the compressor section(s), combustor, and turbine sections) to air mass passing through the core (the bypass ratio) is typically in excess of about 4.0 and, more narrowly, typically between about 4.0 and about 16.0. Via high 24 and low 25 shaft portions of the shaft assembly 23, a high pressure turbine (HPT) section 26 and a low pressure turbine (LPT) section 27 respectively drive a high pressure compressor (HPC) section 28 and a low pressure compressor (LPC) section 30. The engine extends along a longitudinal axis (centerline) 500 from a fore end to an aft end. The exemplary combustor 35 is an annular combustor. Adjacent the fore end, a shroud (fan case) 40 encircles a fan 42 and is supported by vanes 44 (forming a fan frame). An aerodynamic nacelle around the fan case is shown and an aerodynamic nacelle 45 around the engine case is shown. The exemplary fan is a single stage fan (as distinguished from multi-stage co-rotating fans and multi-stage counter-rotating fans).

The exemplary forward rim of the fan case is proximate an engine inlet 31 receiving an inlet flow 502 when the engine is operating. The inlet flow passes downstream through the fan 42 and divides into a core flow 504 passing inboard along a core flowpath 506 within the core case (exiting at a core outlet 33) and a bypass flow 508 passing outboard along a bypass flowpath 510 between the core case nacelle and the fan case.

The LPT blade stages are connected to a transmission 60 (e.g., an epicyclic transmission, more particularly a geared system known as a fan drive gear system (FDGS)) to indirectly drive the fan 42 with a speed reduction.

The exemplary transmission 60 (FIG. 1A) comprises a central externally-toothed sun gear 80. The sun gear 80 is encircled by an internally-toothed ring gear 82. A number of externally-toothed star or planet gears 84 are positioned between and enmeshed with the sun gear 80 and ring gear 82. The star or planet gears 84 can be referred to as intermediate gears. A cage or carrier assembly 86 carries the intermediate gears via associated bearings 88 for rotation about respective bearing axes. The exemplary bearings 88 may be rolling element bearings or may be journal bearings having external circumferential surface portions closely accommodated within internal bore surfaces of the associated intermediate gears 84.

The exemplary carrier assembly 86 comprises a front plate (e.g., annular) in front of the gears and a rear plate (e.g., annular) behind the gears. These plates may be mechanically connected by the bearings 88 and/or by linking portions between adjacent intermediate gears.

In the exemplary embodiment, a forward end of the low shaft 25 is coupled to the sun gear 80. The exemplary low shaft 25 has a generally rigid main portion 90 and a flexible forward portion 92. A forward end of the portion 92 may have a splined outer diameter (OD) surface interfitting with a splined inner diameter (ID) surface of the sun gear 80 to transmit rotation.

The exemplary carrier assembly 86 is substantially non-rotatably mounted relative to the engine case 22. In the exemplary embodiment, the carrier assembly 86 is coupled to the case 22 via a compliant flexure 110 that allows at least small temporary radial and axial excursions and rotational excursions transverse to the centerline 500. The exemplary flexure 110 carries a circumferential array of fingers 111 engaging the carrier 86 (e.g., between adjacent gears 84). A peripheral portion of the flexure 110 is mounted to the case to resist rotation about the centerline 500. Thus, flexing of the flexure 110 accommodates the small excursions mentioned above while holding the carrier against rotation about the centerline.

The exemplary ring 82 is coupled to the fan 42 to rotate with the fan 42 as a unit. In the exemplary embodiment a rear hub 122 of a main fan shaft 120 connects the fan 42 to the ring gear 82. FIG. 1 also shows fan blades 100, each having an airfoil having an inboard end 102 at the hub, an outboard tip 104 adjacent and facing the inboard surface 109 of the fan case 40, a leading edge 106, and a trailing edge 108.

The speed reduction ratio of the transmission 60 is determined by the ratio of diameters of the ring gear 82 to the sun gear 80. This ratio will substantially determine the maximum number of intermediate gears 84 in a given ring. The actual number of intermediate gears 84 will be determined by stability and stress/load sharing considerations. An exemplary reduction is between about 2:1 and about 13:1. Although only one intermediate gear 84 is necessary, in exemplary embodiments, the number of intermediate gears 84 may be between about three and about eleven. An exemplary gear layout with fixed carrier is found in U.S. Patent Application Publication 2012/0251306.

Thus, the exemplary engine 20 has three main rotating components (units) rotating about the centerline 500: the core spool or high spool (including the high pressure turbine 26, the high shaft 24, and the high pressure compressor 28); the low spool (including the low pressure turbine 27 and low shaft 25); and the fan assembly (including the fan 42 itself and the fan shaft 120). Each of these three things needs to be supported against: radial movement; overturning rotations transverse to the centerline 500; and thrust loads (parallel to the centerline 500). Radial and overturning movements are prevented by providing at least two main bearings engaging each of the four units. As is discussed below, such at least two are sufficiently axially spaced to resist the overturning movements.

Each unit would have to also engage at least one thrust bearing. The nature of thrust loads applied to each unit will differ. Accordingly, the properties of required thrust bearings may differ. For example, the fan 42 primarily experiences forward thrust and, therefore, the thrust bearings engaging the fan 42 may be configured to address forward thrust but need not necessarily address rearward thrusts of similar magnitudes, durations, etc.

The FIG. 1 embodiment has two main bearings 148, 150 (FIG. 1) along the fan shaft 120 forward of the transmission 60. Inboard, the inner race of each bearing 148, 150 engages a forward portion of the shaft 120 aft of the fan 42. Outboard, the outer race of each bearing 148, 150 engages static structure of the case. The exemplary static structure comprises a support 152 extending inward and forward from a forward frame 154. These two bearings 148, 150 thus prevent radial excursions and overturning moments which the fan 42 may produce during flight.

To resist thrust loads, one or both of the bearings 148, 150 may be thrust bearings. In an exemplary embodiment, both are thrust bearings (schematically shown as tapered roller bearings). Both may be thrust bearings because there may typically be no differential thermal loading (and thus thermal expansion) of the support 152 relative to the shaft 120 between these bearings. Where the two coupled structures are subject to differences in thermal expansion, it may be desirable to have only one bearing be a thrust bearing.

Figure 1A:
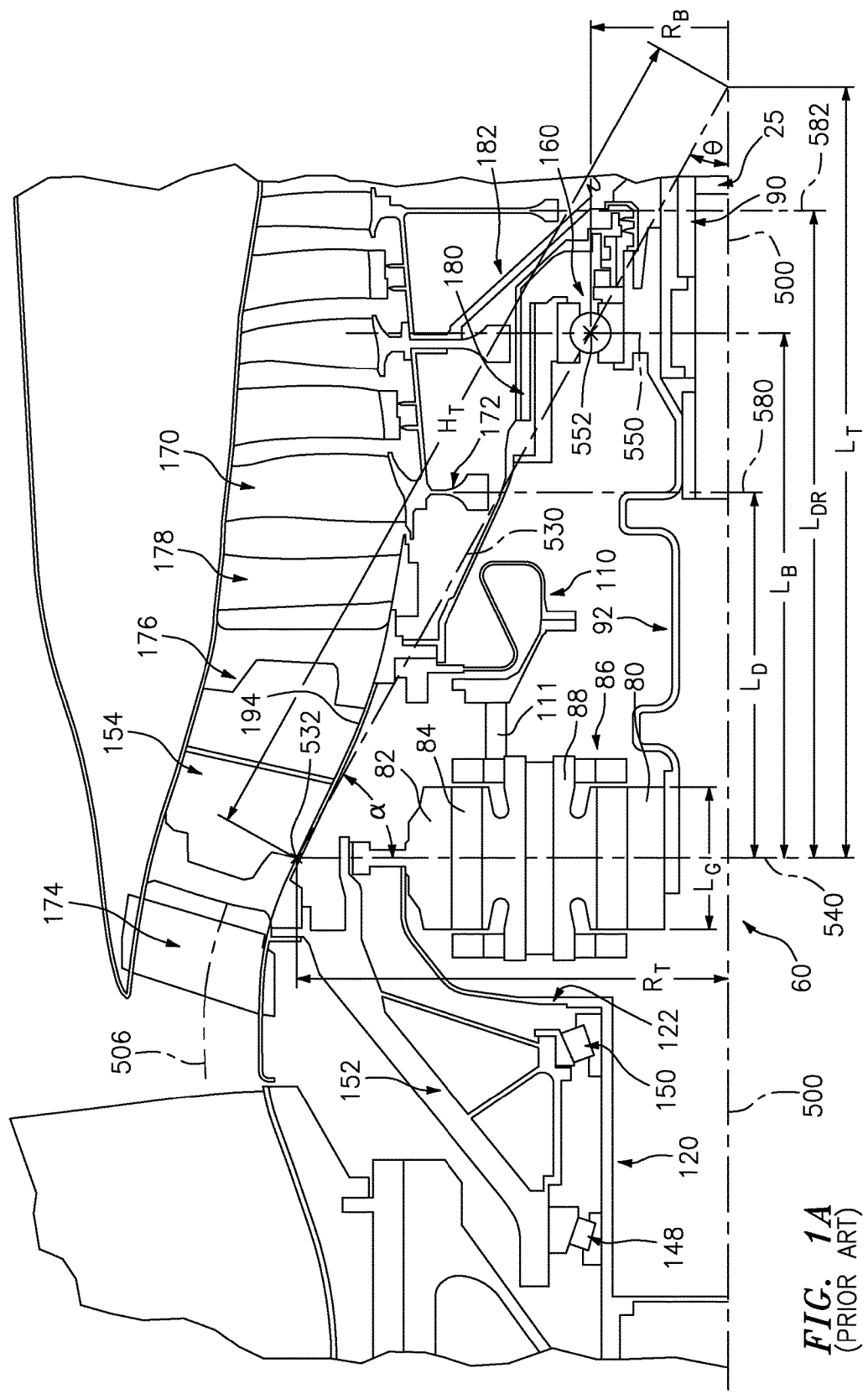
FIG. 1A is an enlarged view of a transmission area of the engine of FIG. 1.

FIG. 1A also shows the first main bearing 160 aft/downstream of the transmission. Depending on the particular engine, this may be a thrust bearing or may be a non-thrust bearing. The relationship of this bearing to the transmission and other structure of the engine may relate to aspects of engine performance and packaging efficiency. As is discussed further below, FIG. 1A also shows a forward bearing support 180 mounting the outer race of bearing 160 to static structure and an LPC hub 182 just behind the bearing. In the exemplary embodiment, both the support 180 and the hub 182 taper rearwardly/inwardly.

One can envision a theoretical conical structure 530 centered on the centerline 500 and passing through: (1) the core flowpath inboard (inner diameter (ID)) boundary 194 at the gear centerplane 540 (location 532); and (2) the center 552 of the bearing 160 (in FIG. 1, the forward bearing that supports the first compressor aft of the gearbox to the static structure). A core flowpath outboard (outer diameter (OD)) boundary is shown as 196. The bearing center is defined as the radial location of the intersections of the rotation axes of roller elements with the bearing centerplane 550 (e.g., the centers 552 of balls or the center of cylindrical rollers as defined by an intersection of the diametrically opposite corners or the centroid of a tapered roller bearing). Viewed in half longitudinal cross-section, this cone projects as a right triangle with a radial leg/height $R_T$, an axial leg/length $L_T$ at the engine centerline and a hypotenuse $H_T$.

$L_G$ (FIG. 1A) is the gear width or length.

$F_R$ (FIG. 1) is the fan radius. $H_R$ is the hub radius. Both may be measured at the leading edge 106 or at the maximum tip radius location or at the centroid of the airfoil section length.

$L_F$ (FIG. 1) is on-center length from fan to gears.

Several modifications, which are the subject of the instant application, allow for a reduction in the cone length $L_T$ which may, in some embodiments, promote engine compactness. Such compactness may provide lower weight (owing to a shorter engine length) and/or a more favorable flow passage from the fan root section into the first compressor aft of the gearbox. Regarding the latter, for example, this may allow reducing the core flowpath 506 inboard radius $R_T$ at the gear centerplane 540 which, in turn, reduces the amount of turning the flow must do when passing over the fan hub and into the core. Additionally, there may be a secondary effect in that the reduction may also facilitate the reduction of the size of the fan bearing support 152 and also the fan hub (thereby decreasing the hub-to-tip ratio ($H_R:F_R$)) and further facilitating the intake of air.

Figure 2:
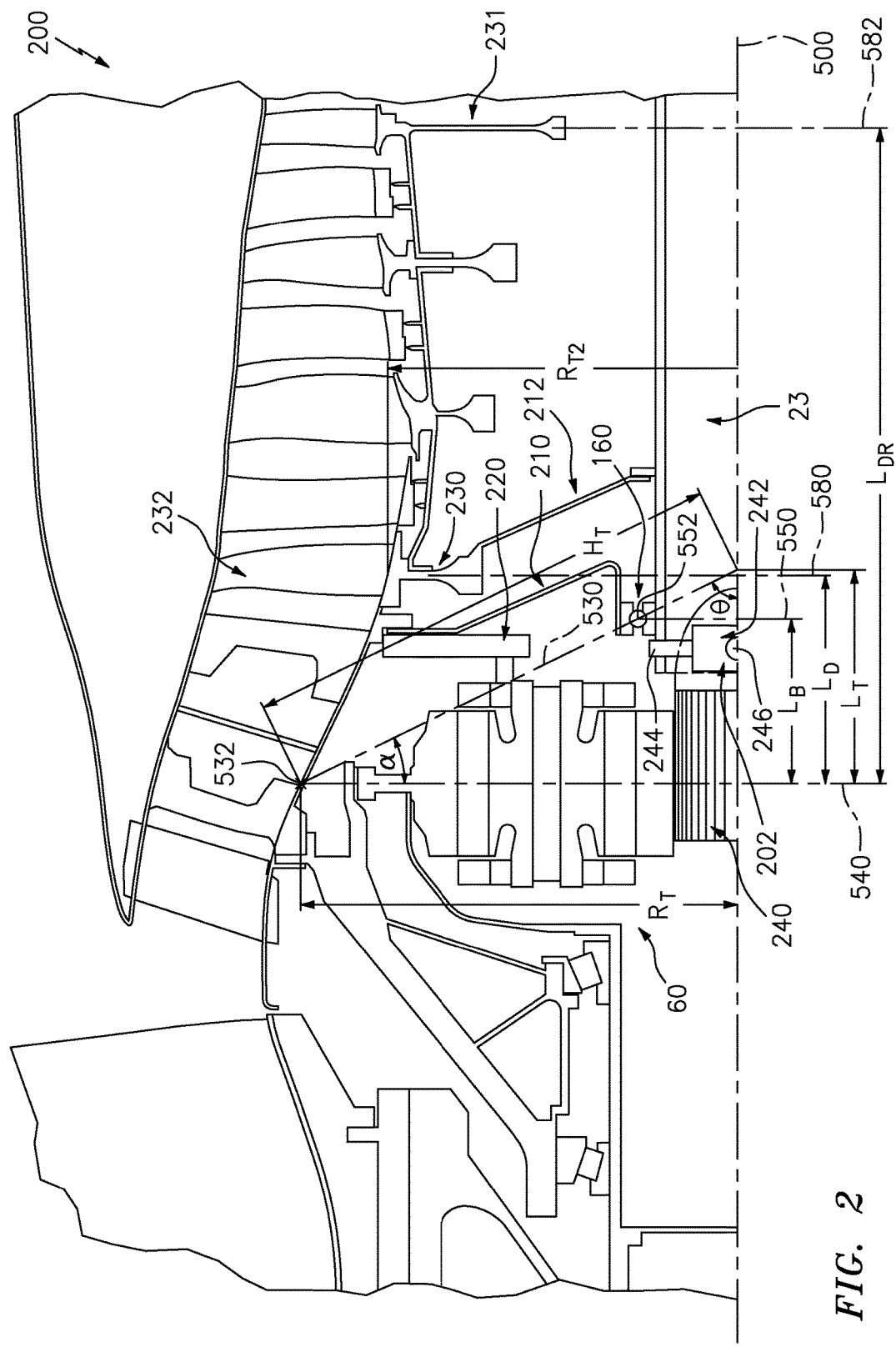
FIG. 2 is a partial longitudinal sectional of a first embodiment of an engine.

As shown in FIG. 2, by reengineering design of FIG. 1, the cone 530 may more steeply intersect the engine centerline, the LPC hub 182 (FIG. 1A) can move forward to shorten the engine. To take the angle α below about 58° (cone half angle θ above 32°), the flexible shaft coupling can be modified. Yet shallower configurations of the cone 530 involve cone half angles θ of above 40° or above 50° or in a range of 33° to 68° or in a range of 40° to 68° or in a range of 50° to 68°.

In the embodiment 200 of FIG. 2, the exemplary modification involves replacing the coupling 92 (FIG. 1A) with an enhanced version of an automotive style coupling 202 (e.g., universal joint or constant velocity joint). The coupling 202 may be optimized for extremely high loads but only very small off-axis deflection when compared to its automotive cousin. Note that the high bypass ratio engine's actual deflections are very small so the range of travel that must be accommodated is very small relative to automotive use. These deflections are termed "thrust bending" which is most acute at high power when the forces from the fan on the fan frame traveling through the engine cases causes a slight bending as they are opposed by the engine mounts causing the fan drive shaft, and the other shafts, to move very slightly off center.

The exemplary embodiment 200 of FIG. 2 adds an additional stage to the three-stage low pressure compressor (LPC) of FIG. 1. In the illustrated reengineering, this is done without shifting the rear end of the LPC, thus maintaining longitudinal size while adding a fourth stage to the LPC (allowing the embodiment 200 to be shorter an alternative four-stage reengineering.

An unillustrated embodiment omits such a joint 202 or flexible coupling entirely, allowing a very small angle α (e.g., as low as 24°) in which case the transmission can be designed to simply accept the misalignment at the expense of reduced life, or another accommodation could be that the designer could reduce stress in the transmission parts by making them more massive and thereby somewhat accommodating the misalignment and resulting vibration.

Figure 4:
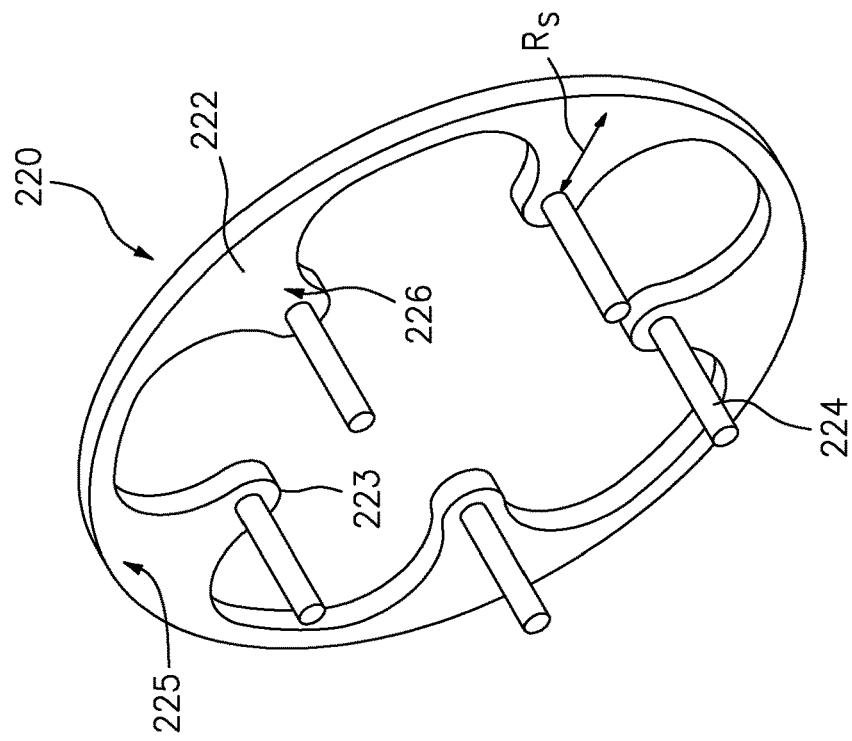
FIG. 4 is a view of the torque frame assembly.
Figure 3:
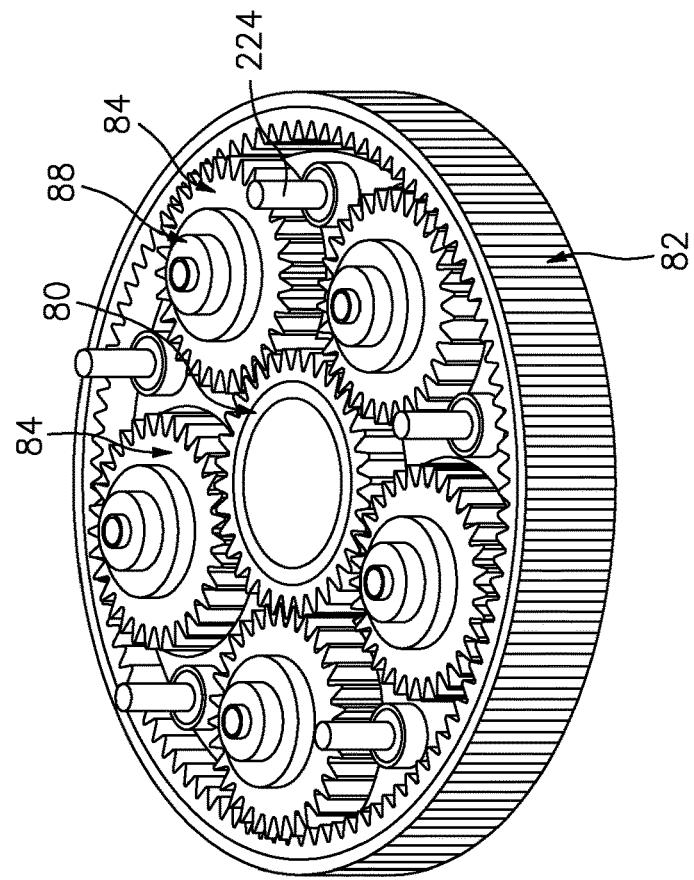
FIG. 3 is a view of a transmission gear showing protruding fingers of a torque frame assembly.

In embodiment 200, of FIG. 2, the included angle α is reduced to as low as an exemplary 24° (cone half angle θ as high as 66°). The first compressor behind the transmission is driven by the LPT or fan drive turbine 27. There is a compact torque frame 220 preventing rotation of transmission components. The exemplary torque frame or flexure 220 (FIG. 4) replaces a baseline convoluted flexure 110 (FIG. 1A) that extends substantially aft from its inboard and outboard mounting flanges. The exemplary frame/flexure has an essentially radial flexible web 222 extending from an inboard portion 223 an inner array of mounting locations (not shown) for carrier mounting fingers 224 to an outboard mounting flange 225 having an outer peripheral array of mounting holes (not shown) for engaging the forward frame or other case structure. A flexible intermediate portion 226 extends along a radial span between the inboard portion 223 and flange 225. FIG. 3 shows the fingers 224 protruding forward through the carrier (whose front plate is shown removed) to prevent rotation of transmission components. The flexure has a small degree of rotational flexibility to resist input torque uniformly among the separate gearbox elements in order to achieve a beneficial effect called "load sharing".

As discussed above, the exemplary flexure 220 may have a smaller degree of convolution in its cross-section and may have a smaller degree of longitudinal excursion of such cross-section relative to the baseline flexure 110. The exemplary flexure (and its web 222) may flex along a radial span $R_S$ (FIG. 4) of the intermediate portion 226 between the fingers and the flange 225. Along this span, the illustrated flexure/web is exactly radial (e.g., a radially-oriented rectangular cross-section). An exemplary low degree of radial departure is characterized by the cross-section not departing from radial by more than a longitudinal distance of half such radial span (more particularly, not more than a quarter of such radial span). In contrast, the FIG. 1A flexure 110 has a longitudinal excursion greater than the associated radial span. Nevertheless, should packaging permit, flexures with greater amounts of convolution and longitudinal excursion are possible.

Further aspects of the possible longitudinal compactness may be viewed relative to the positioning of the compressor disks, the orientations of associated hubs and bearing supports, and the presence of vane/strut structures upstream of the disks. For example, the baseline of FIG. 1A shows blades 170 of a leading/upstreammost/forwardmost disk 172 of the LPC 30. Ahead of it from upstream-to-downstream along the core flowpath are an array of inlet vanes 174, frame struts 176 of the frame 154, and an array of intervening vanes 178. In the exemplary embodiment, the intervening vanes 178 are variable vanes. The exemplary frame struts 176 extend from leading edges just behind trailing edges of the vanes 174 to trailing edges just ahead of leading edges of the vanes 178. In the exemplary FIG. 1A baseline, the outer race of the bearing 160 is held by a support 180 extending aftward and inward from a mounting flange inboard of trailing edges of the frame struts 176. The angle α is fairly close to the average angle of this support (in the exemplary embodiment, the line 530 passes nearly through the bolt circle (not shown) mounting the forward/outboard end of the support 180).

In the reengineered configuration of FIG. 2, the forward/upstreammost compressor disk is labeled 230 and its blades are labeled as 232. The centerplane 580 of the disk 230 is shifted forwardly relative to the FIG. 1 embodiment to substantially reduce length $L_D$ between the transmission centerplane 540 and disk centerplane 580. The centerplane 582 of the rearmost LPC blade disk 231 is in a similar position relative to the FIG. 1 embodiment to substantially maintain length $L_{DR}$ between the transmission centerplane 540 and disk centerplane 582. If the reengineered configuration did not add a stage to the LPC, $L_{DR}$ could be substantially reduced.

FIG. 2 further shows a modified bearing support 210 replacing the FIG. 1A support 180 in supporting the outer race of the bearing 160. The exemplary support 210 is steeper (more close to radial) than the support 180 further facilitating compactness. Similarly, a forward hub 212 of the LPC replaces the forward hub 182. In the exemplary implementation, the axial shortening of the support 210 allows a shift of mounting of the hub 212 relative to the hub 182. Whereas the exemplary hub 182 is mounted to the second disk of the LPC, the exemplary hub 212 is mounted to the first (forward/upstreammost) disk 230.

The exemplary universal joint 202 of FIG. 2 comprises a first clevis or member formed by a forward portion of the low pressure shaft 23 and a second clevis or portion formed by the rear end of a splined member 240 engaging the sun gear. The two members are linked by a cross hinge 242 having a first cross pin 244 and a second cross pin 246 orthogonally intersecting therewith.

Exemplary $L_D$ (FIG. 2) is 2.0 times the gear width $L_G$ (FIG. 1A) or less, more particularly, 1.5 times $L_G$ or less. Alternatively characterized, exemplary $L_D$ is 60% or less of the core flowpath inboard radius $R_{T2}$ at the disk centerplane 580, more particularly, 50% or less of $R_{T2}$. Yet alternatively characterized relative to the core path inboard radius $R_T$ at the gear centerplane 540, exemplary $L_D$ is 50% of $R_T$ or less, more particularly, 40% or less or 30% or less.

In the exemplary four or more stage LPC of FIG. 2, $R_T$ is greater than $L_T$ and $L_B$ is less than $L_T$ and $L_B$ is less than $L_D$. In the exemplary four-stage LPC, exemplary $L_{DR}$ is such that a ratio of $L_{DR}$ to $R_T$ is not more than 1.6:1, more particularly, not more than 1.5:1 or 1.4:1. In higher stage count engines, that ratio may use the spacing between the centerplane and fourth stage as the ratio numerator. In the exemplary seven stage LPCs of the three-spool engines, the elemplary ratio of $L_{DR}$ to $R_T$ is not more than 2.1:1, more particularly, not more than 2.0:1 or 1.9:1. In higher stage count engines, that ratio may use the spacing between the centerplane and seventh stage as the ratio numerator.

The embodiments of FIGS. 5, 6, and 7 (discussed below), are so-called three-spool engines. There are two concentric shafts shown. The inner shaft is from a turbine that drives the gearbox sun but not directly driving any compressor stages. It is, however, possible that a small compressor could be paired with the fan or a complex transmission could drive a compressor forward of the transmission centerplane. A baseline for such embodiments is found in US Patent Application Publication 2012/0315130 the disclosure of which is incorporated by reference in its entirety herein as if set forth at length.

A forward portion of the inner shaft protrudes from a forward portion of the surrounding shaft (which is part of the adjacent compressor/turbine spool).

Figure 5:
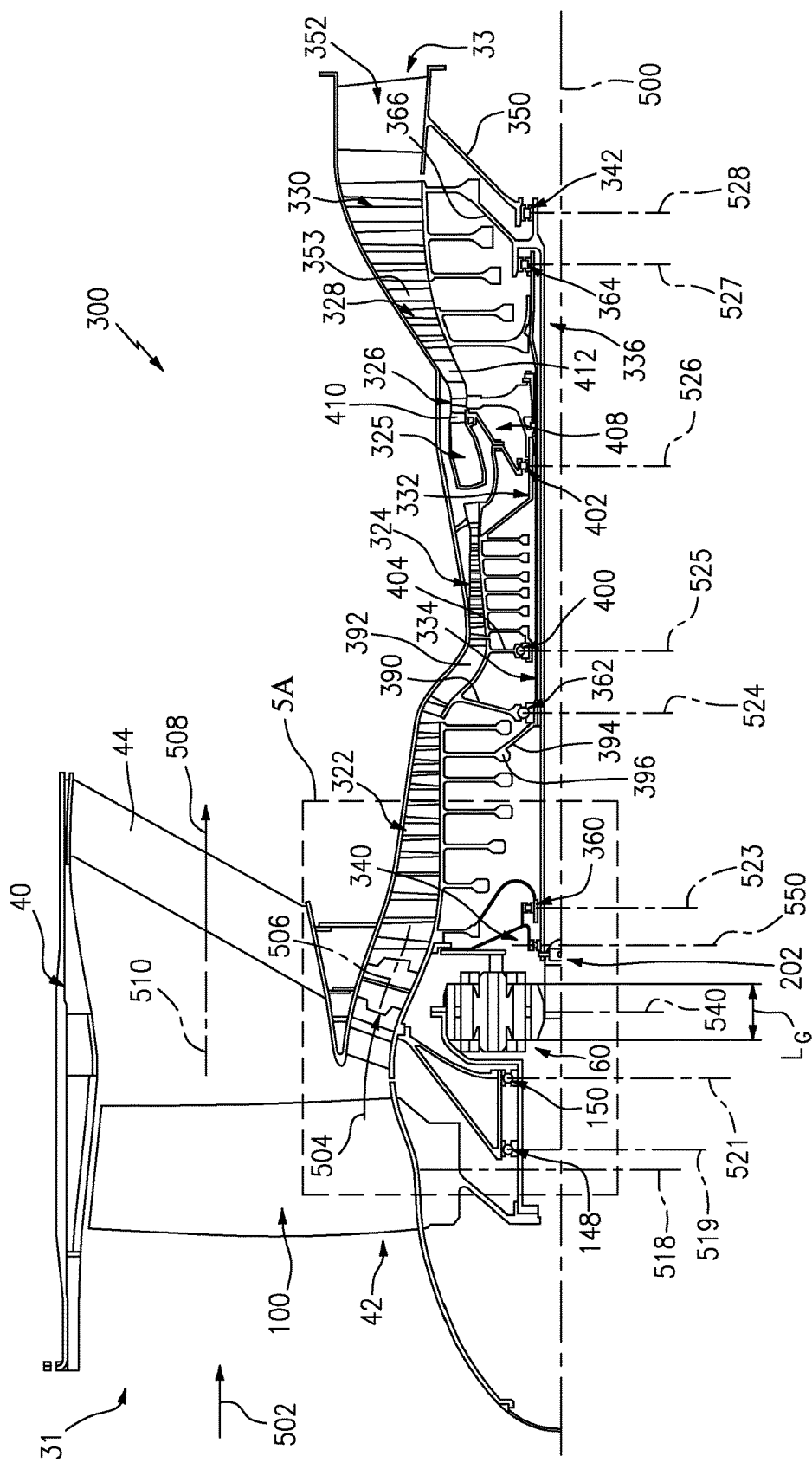
FIG. 5 is a partial longitudinal sectional view of a second embodiment of an engine.
Figure 6:
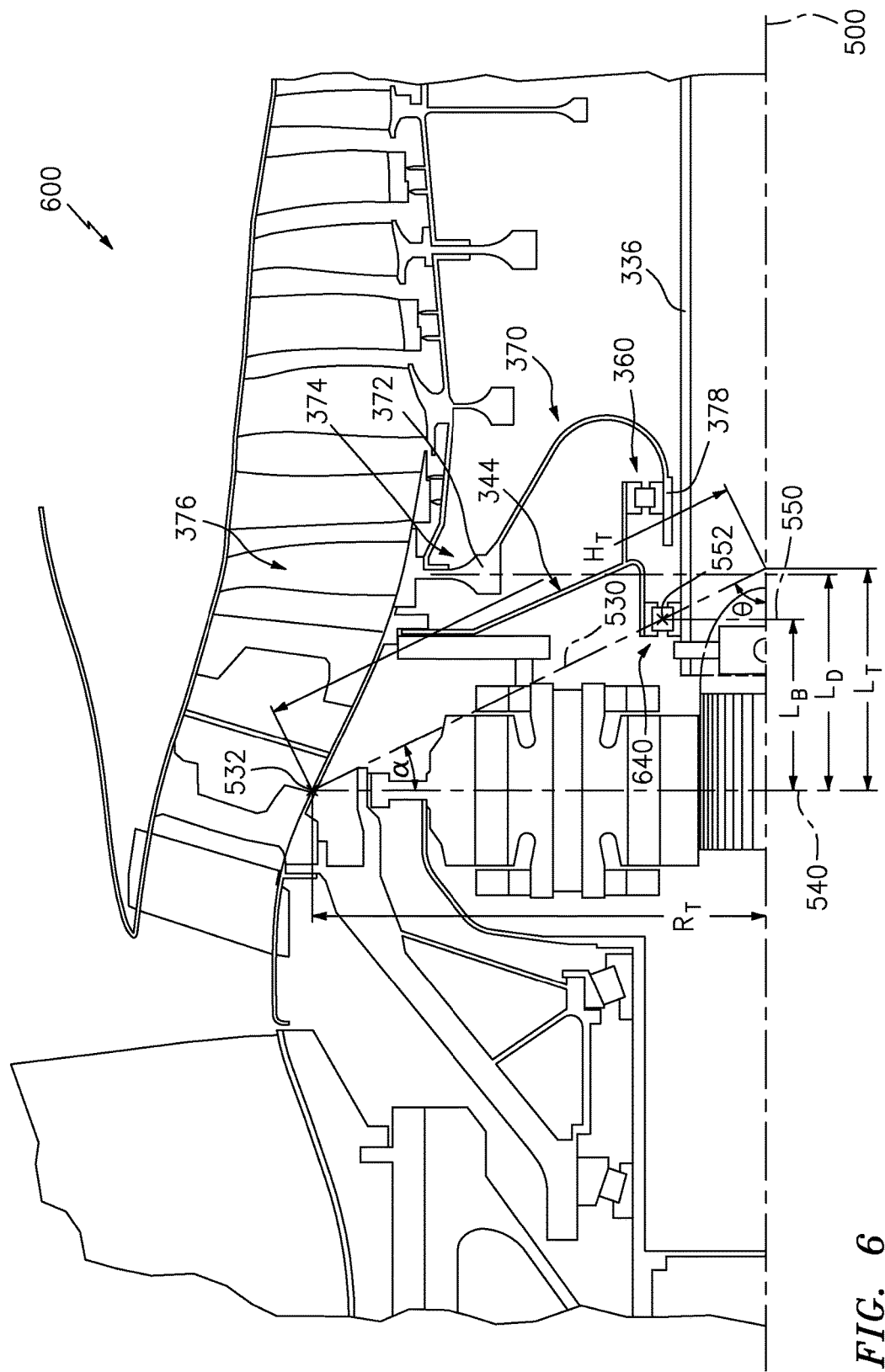
FIG. 6 is a partial longitudinal sectional view of a third embodiment of an engine.

Specifically, FIG. 5 shows a turbofan engine 300 having a fan and transmission structure otherwise similar to the engines 20 and 200.

The core flow 504 (or a majority portion thereof allowing for bleeds, etc.) passes sequentially through one or more compressor sections, a combustor, and one or more turbine sections before exiting the core outlet 33. In the exemplary engine the fan is a single-stage fan having a single stage of fan blades. Each of the compressor and turbine sections may include one or more blade stages mounted to rotate as a unit about the centerline 500. The blade stages may be alternatingly interspersed with vane stages. Each compressor section is co-spooled with an associated turbine section. From upstream to downstream along the core flowpath, the exemplary engine has two compressor sections 322 and 324, the combustor 325, and three turbine sections 326, 328, and 330. The fan and compressor sections (and their stages) progressively compress inlet air which passes into the combustor for combustion with fuel to generate high pressure gas which passes downstream through the turbine sections where the gas pressure is progressively reduced as work is extracted. The turbine section 326 operates at highest pressure and is often referred to as a high pressure turbine (HPT) or a core turbine. The HPT blade stages are connected via a shaft 332 ("high shaft" or "core shaft") to the blade stages of the compressor section 324 to drive that compressor section (often referred to as a high pressure compressor (HPC) or core compressor) to form a high spool or core spool.

The turbine section 328 operates at an intermediate pressure range and is thus often referred to as an intermediate pressure turbine (IPT). The IPT blade stages are connected via a shaft 334 ("intermediate shaft") to the compressor section 322 to drive that compressor section (often referred to as an intermediate pressure compressor (IPC)) to form an intermediate spool.

The turbine section 330 operates at a low pressure range and is thus often referred to as a low pressure turbine (LPT). The LPT blade stages are connected via a shaft 336 ("low shaft") to the transmission 60 to indirectly drive the fan 42 with a speed reduction.

An exemplary high pressure turbine 326 is a single or double stage turbine assembly; an exemplary intermediate turbine 328 is a single or double stage turbine assembly; an exemplary low pressure turbine 330 is a multi-stage turbine (e.g., three or more or an exemplary three to five). Other counts are possible.

In the exemplary (FIG. 5A) embodiment, a forward end of the low shaft 336 is coupled to the sun gear 80 by the universal joint 202 as discussed above.

The exemplary carrier assembly 86 is substantially non-rotatably mounted relative to the engine case 22 (e.g., by the compliant flexure 220 (FIG. 5A) as discussed above).

Thus, the exemplary engine 300 has four main rotating components (units) rotating about the centerline 500: the core spool (including the high pressure turbine 326, the high shaft 332, and the high pressure compressor 324); the intermediate spool (including the intermediate pressure turbine 328, the intermediate shaft 334, and the intermediate pressure compressor 322 (or "lower pressure compressor" to more clearly contemplate the situation that there may or may not be an actual low pressure compressor)); the low spool (including the low pressure turbine 330 and low shaft 336); and the fan assembly (including the fan 42 itself and the fan shaft 120). Each of these four things needs to be supported against: radial movement; overturning rotations transverse to the centerline 500; and thrust loads (parallel to the centerline 500). Radial and overturning movements are prevented by providing at least two main bearings engaging each of the four units.

Each unit would have to also engage at least one thrust bearing. The nature of thrust loads applied to each unit will differ. Accordingly, the properties of required thrust bearings may differ. For example, the fan 42 primarily experiences forward thrust and, therefore, the thrust bearings engaging the fan 42 may be configured to address forward thrust but need not necessarily address rearward thrusts of similar magnitudes, durations, etc.

The FIG. 5 embodiment has the aforementioned two main bearings 148, 150 along the fan shaft forward of the transmission 60.

An exemplary bearing arrangement for supporting the remaining three units is discussed below. Various aspects of each of these may be independently implemented or all may be implemented in a given engine.

The exemplary low shaft 336 is principally radially supported by a forward bearing 340 (in place of 160 of FIG. 2) and an aft bearing 342. The exemplary forward bearing 340 is directly radially grounded to the case 22. An exemplary direct grounding (discussed further below) is via a support 344 (FIG. 5A) (in place of 210 of FIG. 2).

The exemplary aft bearing 342 (FIG. 5) is directly radially grounded to the case 22 via a support 350 extending inward from a frame 352 extending across the core flowpath 504. The exemplary support 350 is aft of the LPT 330 with the frame 352 being a turbine exhaust frame. Alternative implementations may shift the support 350 forward of the LPT 330 to engage an inter-turbine frame 353 between the turbine sections 328 and 330.

In the exemplary embodiment, the bearing 342 is a non-thrust roller bearing (e.g., is a straight roller bearing).

Figure 5A:
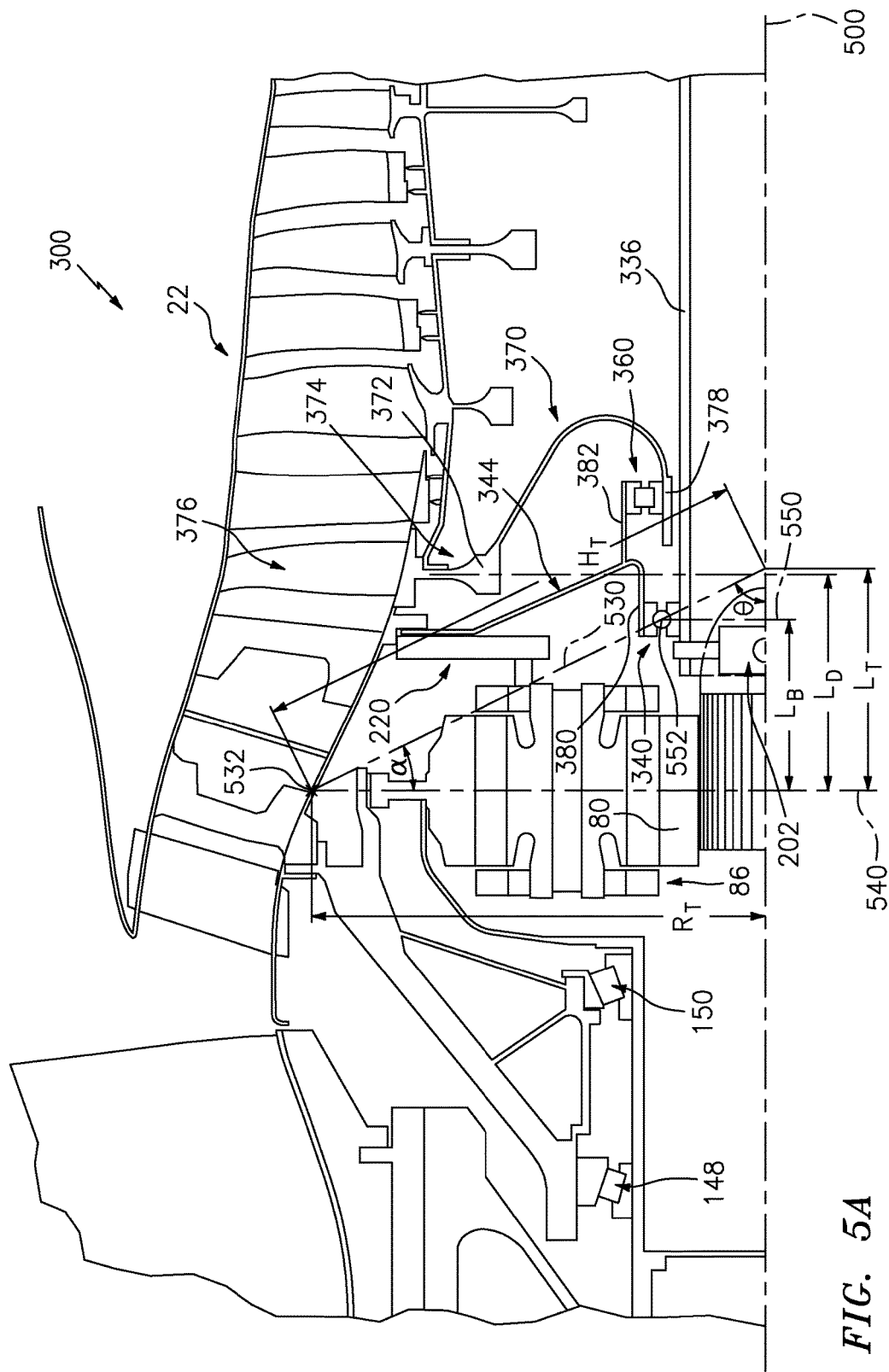
FIG. 5A is an enlarged view of a transmission area of the engine of FIG. 5.

The intermediate spool is supported by a forward bearing 360, an intermediate bearing 362, and an aft bearing 364. In an exemplary embodiment, forward bearing 360 is a non-thrust roller bearing providing radial retention only. The inner race of the bearing 360 (FIG. 5A) is mounted to a hub 370 of the compressor section 322. The exemplary hub is a forwardmost hub of the intermediate spool generally and of the compressor 322 (discussed further below). The exemplary hub 370 extends from a bore 372 of a disk (the forwardmost disk 374 in this embodiment). FIG. 5A further shows the blades 376 of this disk. The exemplary hub 370 extends aftward and inward from the bore 372 but then extends forward to form a short shaft portion 378 mounting the inner race of the bearing 360. The bearing 340 has an outer race engaging a forwardly-extending collar or sleeve 380 at an inboard end of a tapering portion of the support 344. The outer race of the bearing 360 is supported by a rearwardly-extending collar or sleeve 382 of the support 344. The exemplary support 344 may be mounted in a similar fashion to that of the FIG. 2 embodiment.

The exemplary intermediate bearing 362 (FIG. 5) is a bidirectional thrust bearing (e.g., a single stage bidirectional ball bearing) directly radially and axially supporting/grounding the intermediate spool via a support 390 extending to an inter-compressor frame 392 between the compressor sections 322 and 324. The exemplary inner race of the bearing 362 engages (is mounted to) a hub 394 of the intermediate spool. The exemplary hub 394 is a second (aft) hub of the compressor section 322. The exemplary hub 394 extends inward and aft from a bore 396 of one of the disks of the compressor section 322.

A single bidirectional duplex bearing (e.g., two oppositely configured unidirectional ball or roller thrust stages) may also be used as the bearing 220 or other thrust bearing. The close positioning of the two stages may be needed to avoid problems associated with differential thermal expansion of the two bodies (spools or static structure between which the bearings radially intervene). With large gap between stages (e.g., measured as the longitudinal span between the ends of the rolling elements of the first stage and the adjacent ends of the rolling elements of the second stage) differential thermal expansion could either cause bearing disengagement or excessive thrust loads. A small gap (e.g., no more than the individual axial spans of the rolling elements of one or both stages, more broadly no more than 1.5 times twice such axial span) will avoid such problems. In an exemplary gas turbine engine, such a gap may be not more than 30 mm or not more than 25 mm. For example, the intermediate spool and high spool may be subject to greater heating than the case and thus greater thermal expansion. If one of these is supported relative to the case by two widely spaced thrust stages, differential thermal expansion may be a problem. In contrast, the fan shaft and the adjacent portion of the low spool may be at relatively uniform temperature and thus the two bearings 148 and 150 may be more widely spaced.

The bearing 364 indirectly radially supports/grounds the intermediate spool by engaging the intermediate spool and the low spool. In the exemplary embodiment, the inner race of the bearing 364 engages a portion of the intermediate shaft aft of the turbine section 328 and the outer race of the bearing 364 engages a support extending forward from a hub 366 of the LPT 330. The exemplary hub 366 extends forward from the bore of a disk (e.g., the last or downstreammost disk) of the LPT.

The radial loads on the intermediate spool at the bearing 364 will primarily be transmitted to the low shaft 336 and through an aft portion of the low shaft 336 to the bearing 342 and grounded by the support 350 and frame 352. Axial (thrust) loads on the intermediate spool will pass through the bearing 362 via the intervening intermediate shaft.

Thus, in the exemplary embodiment, thrust loads on the low spool are transmitted via the shaft 336 through the bearing 340, and grounded through the support 344.

The core spool may be fully directly supported by two bearings 400 and 402 of which at least one would be a thrust bearing. In the exemplary embodiment, the bearing 400 is a forward bearing grounding a forward portion of the core spool ahead of the compressor section 324 to the inter-compressor frame 392 via a support 404. The aft bearing 402 grounds a portion of the core shaft intermediate the compressor section 324 and turbine section 326 via a support 408 extending to a combustor frame 410 ahead of the turbine section 326. In alternative embodiments, this aft bearing 402 may be shifted aft of the turbine section 326 via a support (not shown) to an inter-turbine frame 412 between the sections 326 and 328. In the exemplary implementation, the bearing 400 is a thrust bearing (e.g., a bidirectional ball bearing with its inner race engaging the core spool and its outer race engaging the support 404). The exemplary bearing 402 is a straight roller bearing with its inner race engaging the core shaft 332 and its outer race engaging the support 408. The exemplary support 404 extends to a rear portion of the frame 392 aft of the support 390. The exemplary inner race of the bearing 400 is mounted to a hub or support extending forward from a bore of a disk (e.g., the upstream-most disk) of the compressor section 324.

FIG. 5 further shows the transmission 60 as having a centerplane 540 and the gears as having a gear width or length $L_G$ and the fan blade array as having a centerplane 518. From fore to aft, the bearings have respective centerplanes 519, 521, 550, 523, 524, 525, 526, 527, and 528.

The only difference in the illustrated portion from embodiment 300 (FIG. 5) to embodiment 600 (FIG. 6) is that a ball bearing 340 becomes a roller 640. However, this may be associated with a change at the turbine end (e.g., where roller bearing somewhere fore or aft of the fan drive turbine becomes a thrust bearing directly axially grounding the fan drive shaft to the case. Alternate thrust bearings may indirectly axially ground via another rotor or other means may be provided for reacting the fan drive turbine thrust loads).

Figure 7:
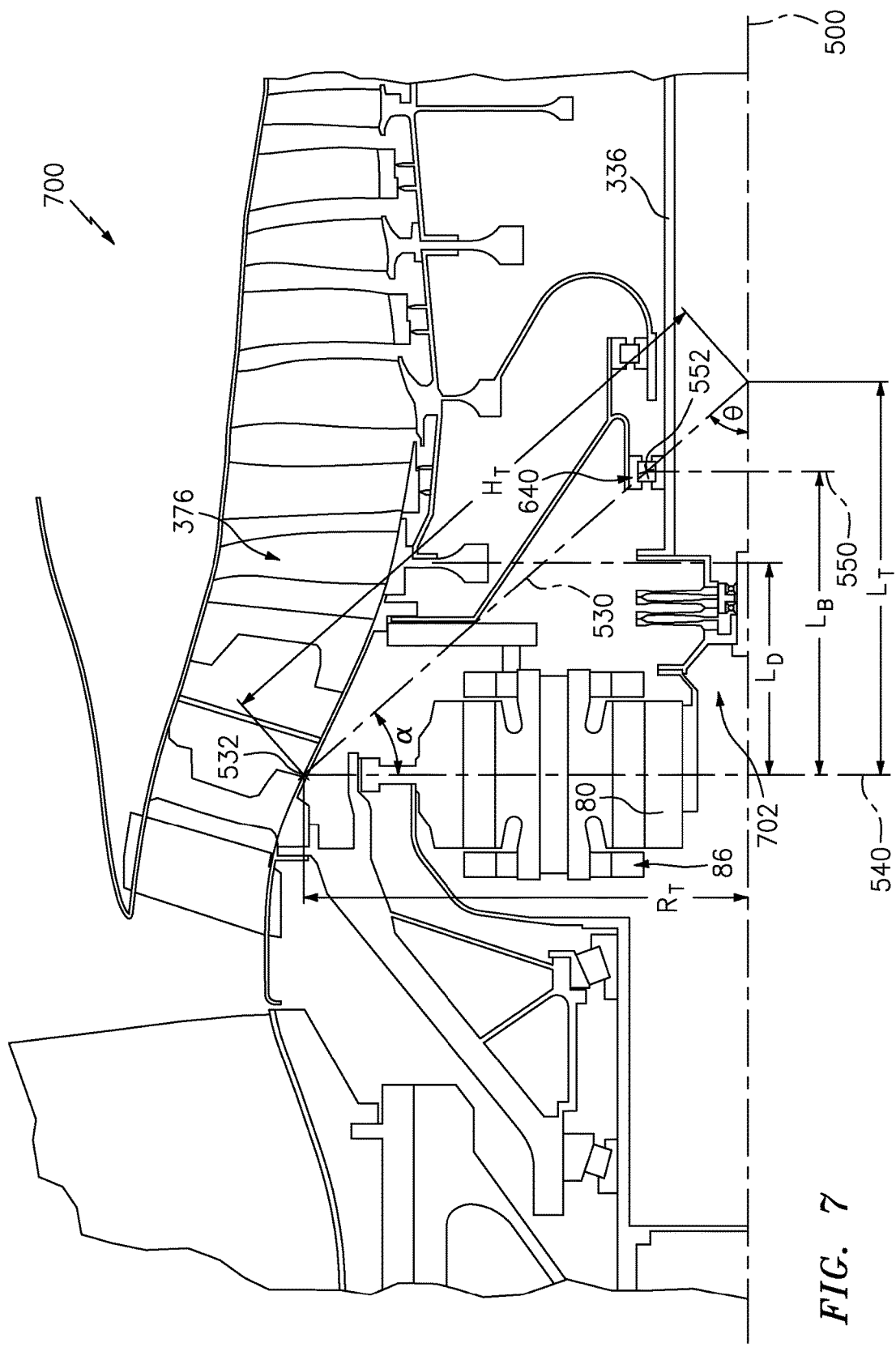
FIG. 7 is a partial longitudinal sectional view of a fourth embodiment of an engine.

The FIG. 7 embodiment 700, replaces the universal joint 202 with a diaphragm coupling 702 (e.g., a Bendix-style coupling). Such exemplary couplings are formed by one or more welded metallic annular diaphragm pairs. That respective front and rear ends of the assembly of one or more diaphragm pairs, the terminal front and rear diaphragms are respectively secured mounting structures for mating with the splined driver of the sun gear and the drive shaft. Each exemplary diaphragm of a given pair is welded to its mating diaphragm at their peripheries. Each diaphragm may be welded or otherwise secured near their inner boundaries to the adjacent diaphragm pair(s) (if any) and to the adjacent mounting structures (if any).

The use of "first", "second", and the like in the following claims is for differentiation within the claim only and does not necessarily indicate relative or absolute importance or temporal order or positional order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic configuration, details of such configuration or its associated environment may influence details of particular implementations. Accordingly, other embodiments are within the scope of the following claims.

What is claimed is:

1. A turbofan engine (300; 600; 700) comprising:
   a fan shaft (120) configured to rotate about an axis (500) of the engine;
   a fan drive gear system (60) configured to drive the fan shaft, the fan drive gear system having a plurality of gears (84) carried by a carrier (86) and having a gear length $L_G$ along an externally toothed portion and a centerplane (540) extending centrally through said externally toothed portion;
   a first spool comprising:
      a high pressure turbine (326); and
      a high pressure compressor (324);
   a second spool comprising:
      an intermediate pressure turbine (328);
      a lower pressure compressor; and
      a shaft (334) coupling the intermediate pressure turbine to the lower pressure compressor;
   a third spool comprising:
      a lower pressure turbine (330) coupled to the fan drive gear system to drive the fan;
   a core flowpath (506); and
   a plurality of main bearings,
   wherein:
      the turbofan engine has a single stage fan;
      of the main bearings, at least one is a shaft-engaging bearing engaging a driving shaft (336) coupled to the fan drive gear system;
      a closest (340; 640) of the shaft-engaging bearings engaging the driving shaft behind the fan drive gear system has a centerplane (550) and a characteristic radius ($R_B$);
      the half angle (θ) of a virtual cone (530) intersecting the core flowpath inboard boundary at the gear system centerplane (540) and said closest of the shaft-engaging bearings at the characteristic radius ($R_B$) is greater than 32°; and
      a hub-to-tip ratio ($H_R$:$F_R$) of the fan is less than 0.38.

2. The engine of claim 1 wherein:
   a length $L_D$ between the centerplane (540) and a centerplane (580) of a forward/upstreammost compressor disk is at least one of:
      2.0 times or less of a gear width $L_G$ of the fan drive gear system;
      60% or less of a core flowpath inboard radius $R_{T2}$ at the forward/upstreammost compressor disk centerplane (580); and
      50% less of a core flowpath inboard radius $R_T$ at the centerplane (540).

3. The engine of claim 2 wherein:
the length $L_D$ between the centerplane (540) and the centerplane (580) of the forward/upstreammost compressor disk is at least one of:
  1.5 times or less of the gear width $L_G$ of the fan drive gear system;
  50% or less of the core flowpath inboard radius $T_{T2}$ at the forward/upstreammost compressor disk centerplane (580); and
  40% less of the core flowpath inboard radius $R_T$ at the centerplane (540).

4. The engine of claim 2 wherein:
the length $L_D$ between the centerplane (540) and the centerplane (580) of the forward/upstreammost compressor disk is all of:
  2.0 times or less of the gear width $L_G$ of the fan drive gear system;
  60% or less of the core flowpath inboard radius $T_{T2}$ at the forward/upstreammost compressor disk centerplane (580); and
  50% less of the core flowpath inboard radius $R_T$ at the centerplane (540).

5. The engine of claim 1 wherein:
a universal joint (202) couples the driving shaft to the fan drive gear system.

6. The engine of claim 1 wherein:
a diaphragm coupling (702) couples the driving shaft to the fan drive gear system.

7. The engine of claim 6 wherein:
the diaphragm coupling (702) is a Bendix-style coupling.

8. The engine of claim 1 wherein:
a flexure retains a carrier in the fan drive gear system, the flexure having a longitudinal cross section characterized by:
  an outboard mounting flange (225);
  an inboard portion (223) engaged to the carrier;
  an intermediate portion (226) extending along a radial span between the outboard portion and the inboard portion.

9. The engine of claim 8 wherein:
the intermediate portion does not depart from radial by more than a longitudinal distance of half of said radial span.

10. The engine of claim 1 wherein one or more of:
a fan bearing is a duplex bearing;
the fan is a single-stage fan;
the case includes a core case and a fan case;
the engine has a bypass ratio of greater than about 6.0.

11. The engine of claim 1 wherein:
a bearing support (344) aft of the fan drive gear system has:
  a forward portion (380) supporting the driving shaft by said closest of the shaft-engaging bearings; and
  an aft portion (382) supporting the second spool shaft by a second bearing (360) of the main bearings.

12. The engine of claim 11 wherein:
said closest of the shaft-engaging bearing (640) and the second bearing (360) are non-thrust bearings;
the second spool shaft engages an additional bearing being a thrust bearing; and
the driving shaft engages an additional bearing being a thrust bearing.

13. A turbofan engine (200; 300; 600; 700) comprising:
a fan supported on a fan shaft (120), the fan shaft configured to rotate about an axis (500) of the engine;
a fan drive gear system (60) configured to drive the fan shaft, the fan drive gear system having a plurality of gears (84) carried by a carrier (86) and having a gear length $L_G$ along an externally toothed portion and a centerplane (540) extending centrally through said externally toothed portion;
a first spool comprising:
  a high pressure turbine (26; 326); and
  a high pressure compressor (28; 324);
a second spool comprising:
  a lower pressure turbine (27; 328);
  a lower pressure compressor; and
  a shaft (25; 334) coupling the lower pressure turbine to the lower pressure compressor;
a core flowpath (506); and
a plurality of main bearings,
wherein:
  of the main bearings, at least one is a shaft-engaging bearing engaging a driving shaft (25; 336) coupled to the fan drive gear system;
  a closest (160; 340; 640) of the shaft-engaging bearings engaging the driving shaft behind the fan drive gear system has a centerplane (550) and a characteristic radius ($R_B$);
  the half angle (θ) of a virtual cone (530) intersecting the core flowpath inboard boundary at the gear system centerplane (540) and said closest of the shaft-engaging bearings at the characteristic radius ($R_B$) is greater than 32°;
  a hub-to-tip ratio ($H_R$:$F_R$) of the fan is less than 0.38; and
  a universal joint (202) or a diaphragm coupling (702) couples the driving shaft to the fan drive gear system.

14. The engine of claim 13 wherein the angle (θ) is 33° to 68°.

15. The engine of claim 13 wherein the hub-to-tip ratio ($H_R$:$F_R$) is 0.24 to 0.33.

16. The engine of claim 13 wherein the angle (θ) is greater than 40°.

17. The engine of claim 13 wherein the angle (θ) is greater than 50°.

18. The engine of claim 13 wherein the closest of the shaft-engaging bearings behind the fan drive gear system is a low spool bearing directly coupling the shaft (25) to a case immediately behind the gear system.

19. The engine of claim 13 wherein at least one of said main bearings is a fan bearing (148, 150) engaging the fan shaft forward of the gear system centerplane.

20. The engine of claim 13 wherein the fan drive gear system comprises:
a sun gear (80);
a ring gear (82);
a plurality of intermediate gears (84) engaging between the sun gear and the ring gear; and
a carrier (86) holding the intermediate gears circumferentially spaced apart from each other.

21. The engine of claim 20 wherein the sun gear is coupled to the driving shaft.

22. The engine of claim 13 further comprising:
a third spool comprising:
  an additional turbine (330) and said driving shaft (336).

23. The engine of claim 22 wherein:
a bearing support (344) aft of the fan drive gear system has:
  a forward portion (380) supporting the driving shaft by said closest of the shaft-engaging bearings; and
  an aft portion (382) supporting the second spool shaft by a second bearing (360) of the main bearings.

24. The engine of claim 23 wherein:
said closest of the shaft-engaging bearing (640) and the second bearing (360) are non-thrust bearings;
the second spool shaft engages an additional bearing being a thrust bearing; and
the driving shaft engages an additional bearing being a thrust bearing.

25. The engine of claim 22 wherein:
a universal joint (202) couples the driving shaft to the fan drive gear system.

26. The engine of claim 22 wherein:
a diaphragm coupling (702) couples the driving shaft to the fan drive gear system.

27. The engine of claim 26 wherein:
the diaphragm coupling (702) is a Bendix-style coupling.

28. The engine of claim 13 wherein:
a flexure retains a carrier in the fan drive gear system, the flexure having a longitudinal cross section characterized by:
an outboard mounting flange (225);
an inboard portion (223) engaged to the carrier;
an intermediate portion (226) extending along a radial span between the outboard portion and the inboard portion and not departing from radial by more than a longitudinal distance of half of said radial span.

29. The engine of claim 13 wherein one or more of:
a fan bearing is a duplex bearing;
the fan is a single-stage fan;
a case includes a core case and a fan case;
the engine has a bypass ratio of greater than 6.0.

30. The engine of claim 13 wherein:
the fan is a single-stage fan having a centerplane (518) and a tip radius ($F_R$); and
a distance ($L_F$) from the fan centerplane to the gear system centerplane is at least one of less than 3.2 times the gear width ($L_G$) and less than 0.37 times the tip radius.

31. The engine of claim 13 wherein:
the fan is a single-stage fan having a centerplane (518), a hub radius ($H_R$) at blade leading edges (106), and a tip radius ($F_R$); and
a ratio of said hub radius to said tip radius is between 0.24 and 0.33.

\* \* \* \* \*